United States Patent [19]

Bass

[11] 4,211,078
[45] Jul. 8, 1980

[54] DYNAMIC POWER SOURCE

[76] Inventor: Robert F. Bass, 428 A St., Myrtle Point, Oreg. 97458

[21] Appl. No.: 14,238

[22] Filed: Feb. 22, 1979

[51] Int. Cl.² ............................ F15B 1/02; F15B 15/18
[52] U.S. Cl. ..................................... 60/413; 60/468; 185/27; 417/229
[58] Field of Search ................. 417/229, 334; 60/398, 60/413, 468; 185/4, 5, 27, 28

[56] References Cited

U.S. PATENT DOCUMENTS

| | | | |
|---|---|---|---|
| 159,660 | 2/1875 | Faivre | 417/229 |
| 196,128 | 10/1877 | Snook | 60/413 |
| 599,756 | 3/1898 | Wright | 60/413 |
| 1,391,503 | 9/1921 | Register | 417/229 |
| 2,020,361 | 11/1935 | Johnston | 417/214 |
| 2,333,614 | 11/1943 | Boyd | 417/229 |
| 2,374,909 | 5/1945 | Williams | 60/434 X |
| 2,554,381 | 5/1951 | Patterson | 60/413 X |
| 3,122,992 | 3/1964 | Kautz | 60/415 X |
| 3,570,245 | 3/1971 | van der Linde | 60/468 X |
| 4,004,422 | 1/1977 | LeVan | 60/533 |
| 4,130,064 | 12/1978 | Bridwell | 417/229 X |

*Primary Examiner*—Edgar W. Geoghegan
*Attorney, Agent, or Firm*—Lee R. Schermerhorn

[57] ABSTRACT

A cylinder is arranged to pump hydraulic fluid into a pressure accumulator. The stored hydraulic fluid operates a hydraulic motor to drive an alternator to generate electric power. The cylinder may be a single acting cylinder having a piston rod depressed by the weight of passing traffic on a railroad track or highway, or the cylinder may be a double acting cylinder having a piston rod reciprocated by a windmill, whereby otherwise wasted energy is converted into productive energy.

3 Claims, 5 Drawing Figures

DYNAMIC POWER SOURCE

BACKGROUND OF THE INVENTION

This invention relates to apparatus for converting otherwise wasted energy into productive energy.

Two examples of commonly wasted energy of considerable magnitude are wind power and the deflection of track rails under the wheels of passing trains. The present apparatus utilizes such sources of energy to produce and store hydraulic pressure for operating an alternator which continues to generate electric power during intervals when the source energy is not available.

Previous attempts to utilize such sources of wasted energy have not been successful. In some instances there has been no provision for the storage of energy so that power could be generated during intervals when the source energy is not available. Such systems are of little value where the source energy is of intermittent nature. In other instances the proposed systems have been too complicated and inefficient to be practical.

SUMMARY OF THE INVENTION

The present system comprises essentially an hydraulic cylinder, pressure accumulator, hydraulic motor driving an alternator, a reservoir, and piping and valves interconnecting these components. When a piston in the cylinder is moved downward by a weight responding to the force of gravity a single acting cylinder is used. When the piston is reciprocated in opposite directions, as by a windmill, a double acting cylinder is used.

Hydraulic fluid is pumped from the cylinder into the accumulator and then to the hydraulic motor which drives an alternator to generate electric power. From the motor the hydraulic fluid is returned to the reservoir which supplies the cylinder. Thus, the accumulator continues to supply the motor with hydraulic fluid during intervals when the piston is not pumping so that electric power may be generated as needed, while the piston is pumping and while it is not pumping.

The invention will be better understood and additional objects and advantages will become apparent from the following description of the preferred embodiments illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENTS

Figures 4, 5:
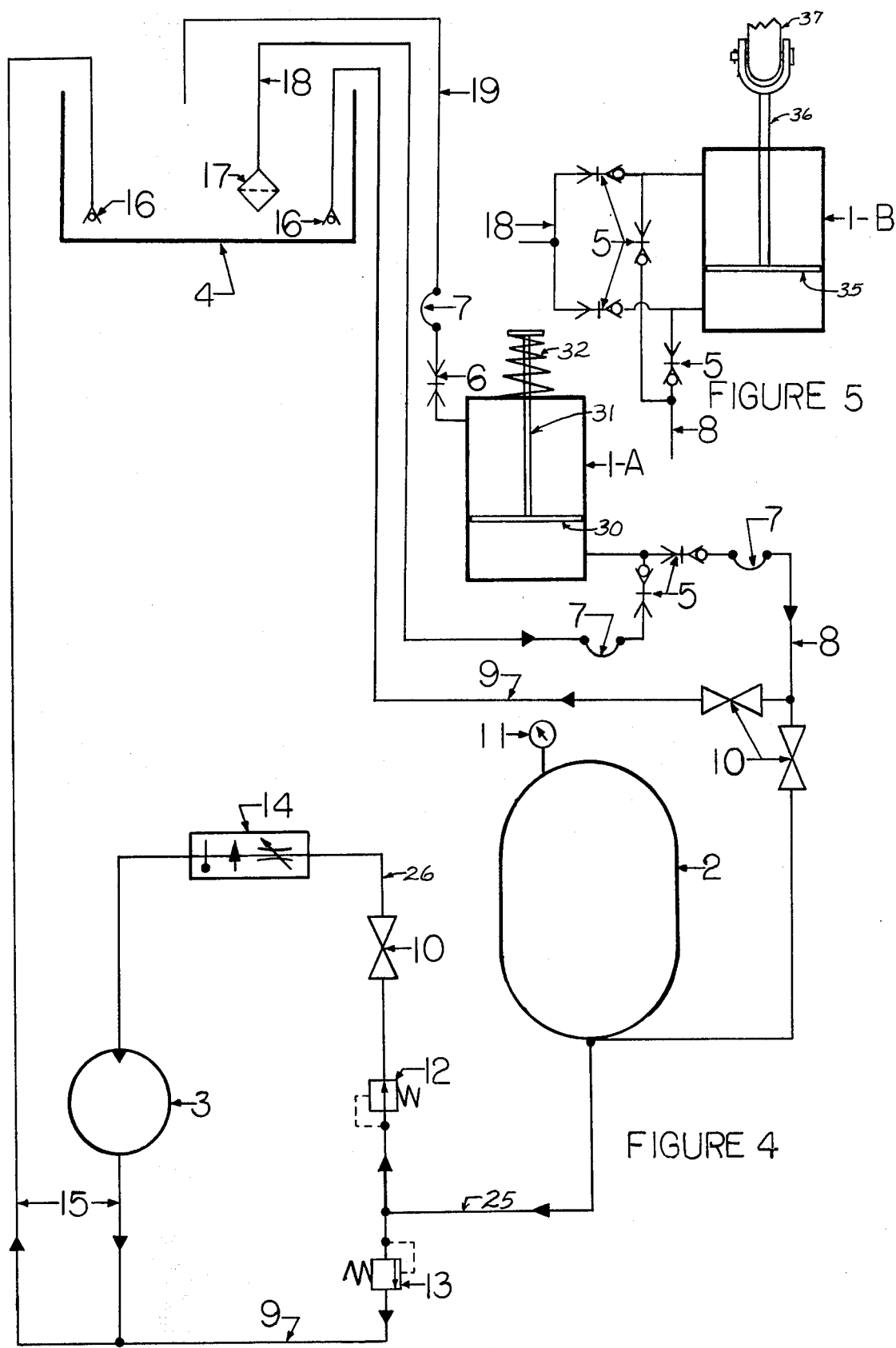
FIG. 4 is diagramatic view of the hydraulic system including a single acting cylinder.
FIG. 5 illustrates the hydraulic connections for a double acting cylinder.

Referring first to FIG. 4, the single acting cylinder 1-A pumps hydraulic fluid into accumulator 2 to operate hydraulic motor 3 which drives an alternator to generate electric power. Motor 3 discharges the hydraulic fluid into reservoir 4 which supplies the cylinder.

The hydraulic lines connected with the cylinder are equipped with a pair of quick disconnect fittings 5, as shown, each having a check valve. Quick disconnect fitting 6 has no check valve. The lines associated with the cylinder further include a plurality of flexible line sections as indicated at 7.

Line 8 is a high pressure main hydraulic line from the cylinder to the accumulator. Lines 9 are high pressure by-pass lines, there being one such by-pass around accumulator 2 and another around motor 3. Connected in the former and also in line 8 are a pair of manual shut-off valves 10. A third manual shut-off valve 10 controls the supply to motor 3.

The upper portion of accumulator 2 forms a compressed gas chamber which is equipped with a pressure indicator 11. In the supply line to motor 3 is a low pressure relief valve 12 and in the by-pass line 9 around motor 3 is a high pressure relief valve 13. Valve 14 is a temperature and pressure compensated adjustable valve to control the rate of flow of hydraulic fluid to motor 3.

Line 15 is a spent fluid, or discharge, line from motor 3 to a check valve 16 in reservoir 4. A filter-strainer 17 is provided on the inlet end of a feeder line 18 from the reservoir to the cylinder.

Reservoir 4 is preferably at atmospheric pressure and positioned at a higher elevation than cylinder 1-A for gravity feed supply to the cylinder through line 18. Line 19 is breather line from the rod end of the cylinder to the reservoir so that air will not be discharged from the cylinder directly into the atmosphere, in the event that such air might be considered to have a contaminating effect on the environment. The reservoir may be covered so that the whole hydraulic system operates as a closed system.

Other lines not thus far specifically identified comprise high pressure lines 25 and 26 from accumulator 2 to hydraulic motor 3.

Piston 30 has a piston rod 31 which extends out of the closed upper end of cylinder 1-A and is urged upward by a compression spring 32. An external force acting downward on piston rod 31 displaces hydraulic fluid under pressure into accumulator 2 and draws air into the upper end of the cylinder through breather line 19. When the external downward force has been relieved from piston rod 31, spring 32 raises the piston to draw hydraulic fluid into the lower end of the cylinder through feeder line 18 and expel air from the upper end of the cylinder through breather line 19.

When the piston is not operating, the gas pressure in accumulator 2 maintains pressure on the hydraulic fluid in the accumulator to continue to operate motor 3.

In FIG. 5 the double acting cylinder 1-B contains a piston 35 having a piston rod 36. In this modification the piston rod is reciprocated up and down by a connecting rod or pitman 37 connected with a crank on the shaft of a windmill. The check valves at 5 provide for pumping hydraulic fluid into high pressure main line 8 in both up and down strokes of the piston with hydraulic fluid supplied to the opposite sides of the piston through feeder line 18. Breather line 19 is omitted in FIG. 5. The rest of the hydraulic system in FIG. 5 is the same as shown in FIG. 4.

Figure 1:
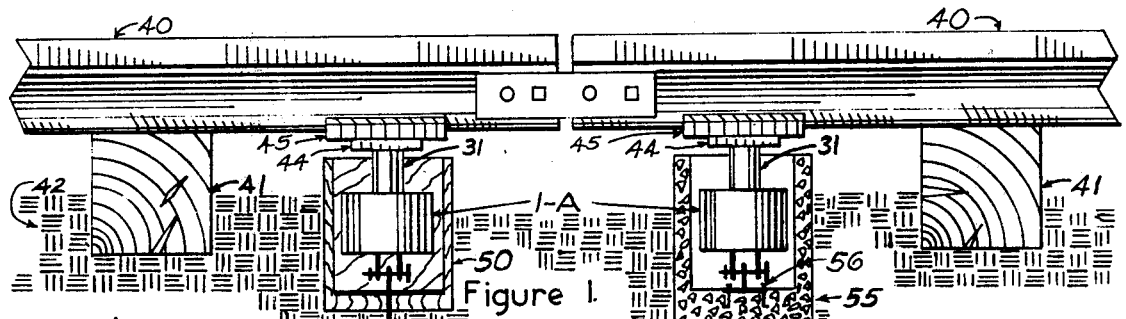
FIG. 1 is a side elevation view of a railroad track showing different arrangements for the placement of hydraulic cylinders under the rail members to produce hydraulic pressure according to the invention.
Figure 2:
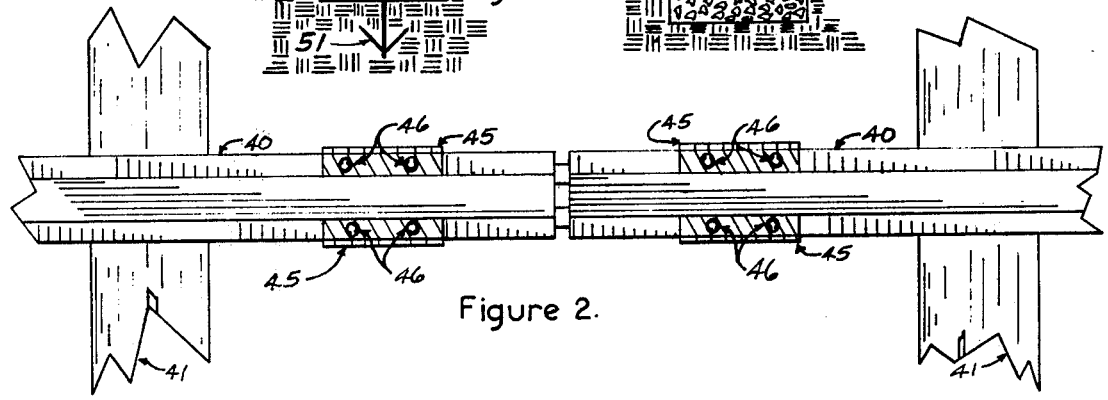
FIG. 2 is a top plan view of the track in FIG. 1.
Figure 3:
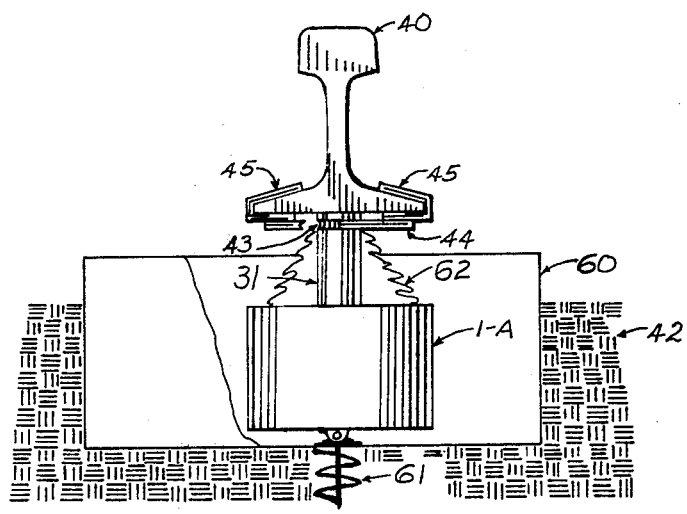
FIG. 3 is a cross-section view through a rail showing a different form of cylinder placement and anchor.

In FIGS. 1 and 2, railroad track rails 40 are supported in conventional manner on wood cross-ties 41 in a road bed 42. As shown in FIG. 3, the upper end portion of piston rod 31 in cylinder 1-A is provided with an annular groove 43 for connection with an adjustable bracket 44 underlying the rail flange. Bracket arms 45 overlie the top of the rail flange and are equipped with screws 46 to clamp the flange. Thus, the weight of a passing train deflects the rails 40 between the cross-ties 41 depressing piston rod 31 in each cylinder 1-A. Any desired number of cylinders may be distributed along the track and connected to high pressure main line 8 to pump hydraulic fluid into accumulator 2 in FIG. 4.

The use of brackets 44 to clamp the rails 40 in FIGS. 1-3 makes the spring 32 in FIG. 4 unnecessary. The rails themselves will lift the pistons after the train wheels have passed.

The cylinders 1-A may be supported in various ways in road bed 42 between the cross-ties 41 and it is not essential that the cylinders be associated with a rail joint as shown in FIG. 1. For example, the left cylinder in FIG. 1 is mounted in an open end wood trough 50 with the lower end of the cylinder held down by an earth anchor 51 projecting through the bottom of the trough.

The cylinder on the right in FIG. 1 is mounted in an open end concrete trough 55 and is held down by an anchor 56 in the concrete. The cylinder in FIG. 3 is mounted in an open end metal trough 60 and is held down by an auger type earth anchor 61. Piston rod 31 is enclosed in a rubber dust boot 62. The piston rods in FIG. 1 may also be equipped with such a dust boot if desired. Troughs 50, 55 and 60 may extend across the track to support additional cylinders 1-A under the opposite rail.

The single acting cylinder 1-A is not limited to use with railway tracks. It may also be operated by a treadle or similar device in any roadway carrying vehicular traffic and in sidewalks or other walkways or stairways for pedestrian traffic. The system is, of course, most effective where there is a high volume of traffic as in the case of arterial highways, bridges and city streets. But even where there is not heavy traffic the present system, including the windmill modification, is still of advantage to generate electric power in remote places not served by existing power lines.

What is claimed is:

1. A dynamic power source comprising a cylinder, a piston movable in said cylinder, an hydraulic accumulator, a cylinder discharge conduit connecting said cylinder with said accumulator to convey hydraulic fluid displaced by said piston into said accumulator, a check valve in said conduit to prevent backflow into said cylinder, said accumulator having a compressed gas space in its upper portion to maintain pressure on said hydraulic fluid in the accumulator, an hydraulic fluid supply reservoir, a cylinder supply conduit from said reservoir to said cylinder discharge conduit, a check valve in said supply conduit to prevent backflow therein, an accumulator bypass conduit from said cylinder discharge conduit to said reservoir, valve means in said bypass conduit and cylinder discharge conduit to direct hydraulic fluid from said cylinder either to said accumulator or to said reservoir, an hydraulic motor, a motor supply conduit from said accumulator to said motor, an adjustable valve in said motor supply conduit to control the flow of hydraulic fluid to said motor, a low pressure relief valve in said motor supply conduit, a motor discharge conduit from said motor to said reservoir, a motor bypass conduit from said motor supply conduit to said motor discharge conduit, and a high pressure relief valve in said motor bypass conduit.

2. A power source as defined in claim 1, said cylinder being a double acting cylinder and said piston being reciprocated by a force acting in opposite directions.

3. A power source as defined in claim 1, said cylinder being a single acting cylinder.

* * * * *